UNITED STATES PATENT OFFICE.

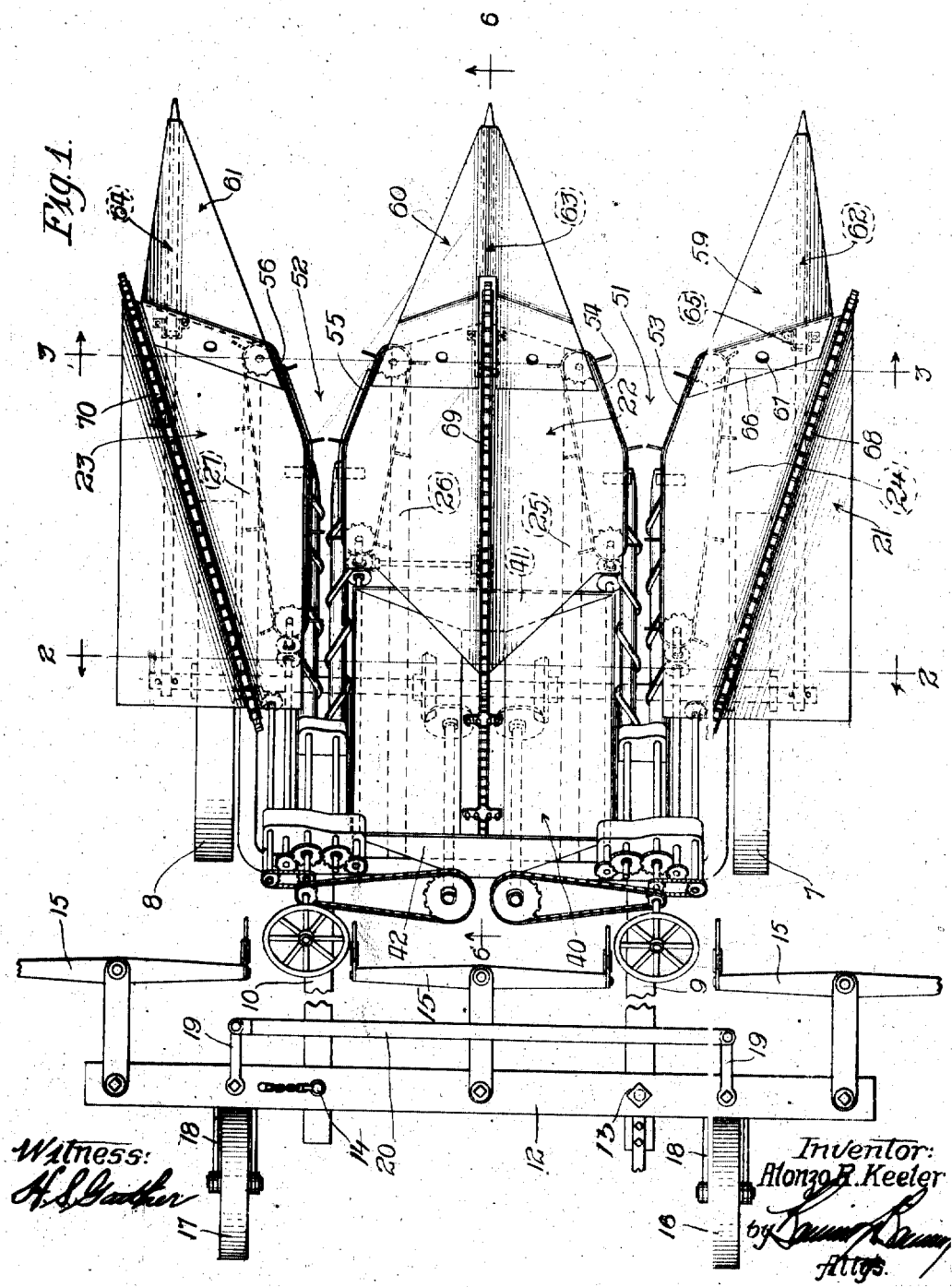

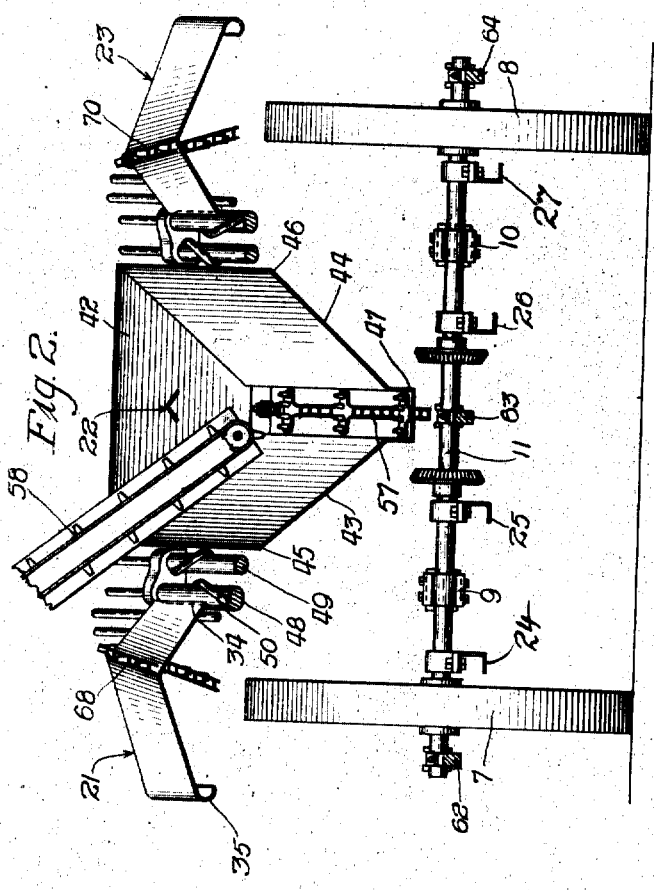
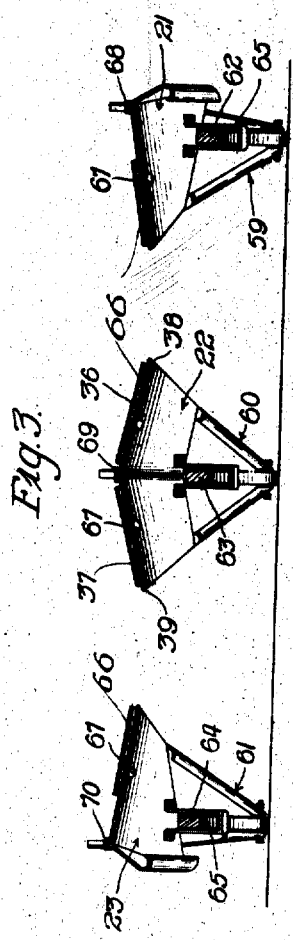

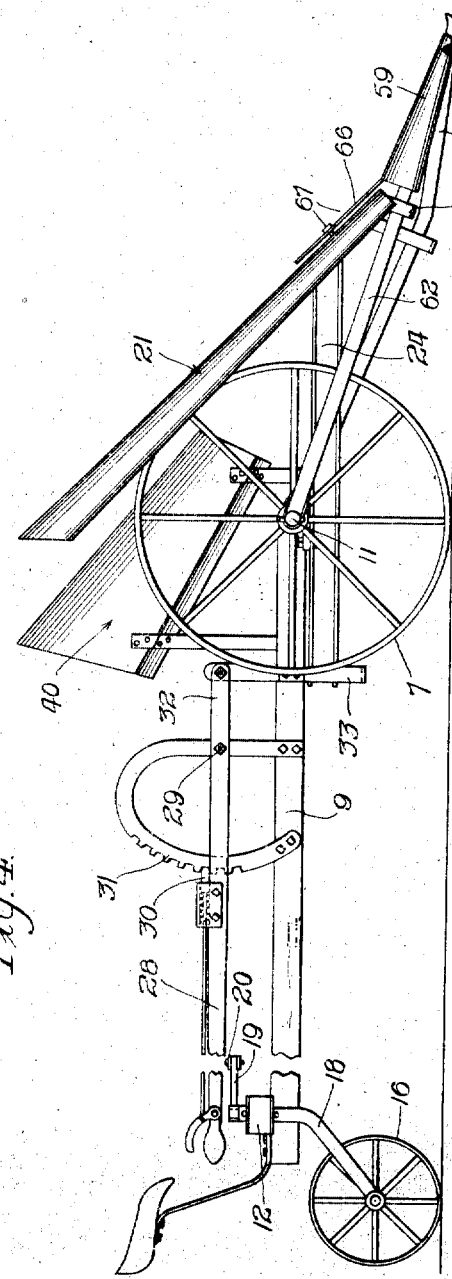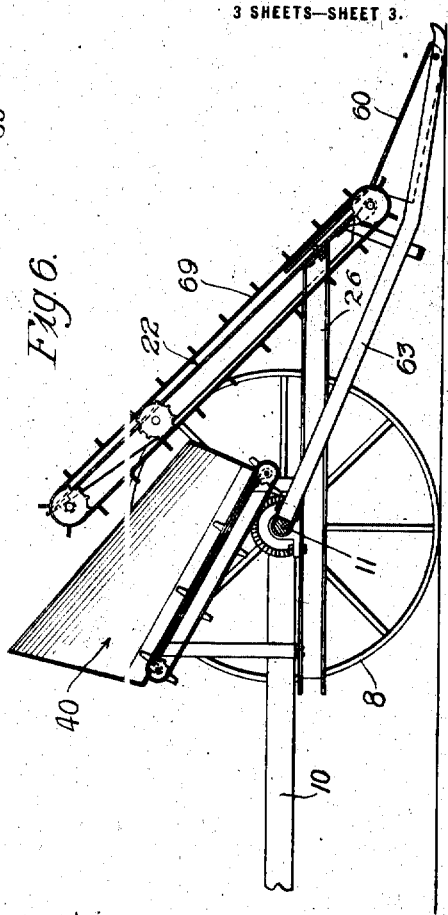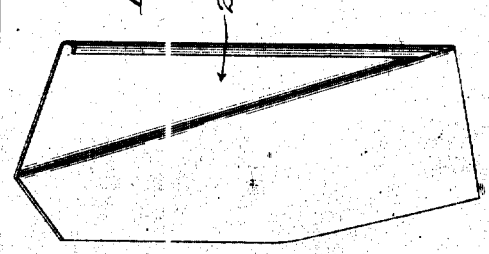

ALONZO R. KEELER, OF ALTONA, ILLINOIS.

CORN-GATHERER.

1,219,327.  Specification of Letters Patent.  Patented Mar. 13, 1917.

Application filed February 11, 1916.  Serial No. 77,651.

*To all whom it may concern:*

Be it known that I, ALONZO R. KEELER, a citizen of the United States, residing at Altona, in the county of Knox and State of Illinois, have invented certain new and useful Improvements in Corn-Gatherers, of which the following is a specification.

The present invention relates to certain improvements in corn gatherers, or machines for gathering the ears of corn from the stalks in the field. There have, in the past, been devised many constructions of machine for accomplishing this result, but as far as I am aware all of such machines have been open to a number of serious objections in their operation. One of these objections has reference to the inability of such previous machines to lift the down stalks into proper position for the action of the snapping rolls. Ordinarily, when the corn stalks are felled by wind or otherwise, they snap at a point a foot or eighteen inches above the ground, and fall over so that the upper portions of the stalks lie against the ground. As a result, there remains a standing portion of one or more feet in height to which is connected one end of the felled stalk. In case an attempt is made to raise the felled stalk by application of a lifting force at a point adjacent to the standing portion, said stalk will break at another point adjacent to the point of application of such lifting force. This is true because the major portion of the weight consists of the ears of corn which are located well up along the body of the stalk, and is further true because the stalk itself is not very strong mechanically. Inasmuch as the proportion of down stalks is usually large, depending upon the season and locality, it follows that machines which are unable to properly lift such stalks into raised position for the operation of the snapping rolls will pass over a very large portion of the crop in the field.

The main object of the present invention is to provide a construction of machine which will effectively raise the down stalks, no matter in what direction they may lie with respect to the direction of travel of the machine, so as to bring said stalks into the bite of the snapping rolls. Another object is to accomplish the foregoing result within a form of machine which is so constructed that it will readily accommodate and adapt itself to inequalities in the surface of the ground. This will make it possible for the machine to operate successfully in the lifting of the down stalks even where the field is comparatively rough or uneven.

Another feature of the invention has reference to the construction of the machine in such form that it can be readily used as a two-row machine—that is, one adapted to remove the corn simultaneously from two adjacent rows. Another object of the invention is to generally improve the mechanical construction of the device so as to simplify its construction and operation, while at the same time improving the operation and the quality of the work which it will perform.

Other objects and uses of the invention will appear from a detailed description of the same which consists in the features of construction and combinations of parts hereinafter described and claimed.

Referring to the drawings:

Figure 1 shows a plan view of a two-row machine embodying the features of the present invention;

Fig. 2 shows a vertical cross section taken on line 2—2 of Fig. 1, looking in the direction of the arrows;

Fig. 3 shows a vertical cross section taken on the line 3—3 of Fig. 1, looking in the direction of the arrows;

Fig. 4 shows a side elevation of the machine;

Fig. 5 shows a rear view of one of the side aprons; and

Fig. 6 shows a vertical section taken on the line 6—6 of Fig. 1, looking in the direction of the arrows.

As above stated, all previous forms of corn removers, with which I am aware, have been open to the objection that they will not successfully raise the down corn into a standing position, or at any rate into such a position that they can be effectively operated upon by the snapping rolls. In order to successfully accomplish this lifting, it is necessary to apply a lifting force to the stalks in such a manner as to raise the upper portions of the stalks without breaking the stalks at points intermediate the ears and the standing portion. This lifting force should be applied as close as possible to the ears themselves, and should be applied by the exertion of a lifting pressure over a considerable length of the stalk itself. Furthermore, the mechanism should be so constructed that the lifting force will be gradually brought into effect so as to gradually and evenly raise the stalk.

I have provided means for accomplishing the foregoing results. In the particular construction illustrated in the drawings, said means takes the form of one or more aprons which sweep the ground in advance of the body portion of the machine itself, said aprons being so constructed as to sweep practically the entire width of ground between two successive corn rows in order to gradually and evenly raise all of the down stalks lying in their path of travel.

In order to assist the movement of the stalks toward the snapping rolls and in order to assist the raising of the stalks, I have provided suitable conveyers or carriers whose function is to cause a movement of the stalks upward and toward the snapping rolls, so that the entire lifting force will not be dependent upon the wedging action of the aprons and slides previously mentioned.

Referring now to the several figures, the machine therein illustrated is provided with a pair of relatively large wheels 7 and 8 in its forward portion, said wheels being adapted to travel on the ground outside of the corn rows which are being operated upon. These wheels are conveniently shown as being mounted on the forward ends of a frame having rearwardly extending rails 9 and 10. The axle 11 is journaled to the forward ends of the rails 9 and 10, and said axle is connected to one or more of the wheels and is driven by them.

The rear portion of the frame is driven in any convenient manner as by horse power or engine power, but in the particular construction illustrated a horse-driven construction is shown. The same includes a cross bar 12 pivoted to the rear end of the rail 9 at the point 13, and having a lock 14 whereby it may be connected to the rear end of the rail 10. This bar 12 carries the whiffletrees 15 which are drawn by the horses. When it is desired to drive the horse in between the rails 9 and 10, the bar 12 can be unlocked from the rail 10 and swung back to allow the horse to walk into position. The bar 12 carries a pair of guide wheels 16 and 17, which preferably trail, as shown in Fig. 4, said guide wheels supporting the rear end of the frame and also serving as a convenient steering means. For this purpose, each guide wheel is carried by a fork 18, the upper end of which is pivoted to the bar 12, said upper ends being provided with levers 19 which are connected by a link 20. The steering may be accomplished by moving the link back and forth from one side to the other in any suitable manner.

Connected to the forward portion of the frame are the tables 21, 22, and 23. These tables slope upwardly at a convenient angle, as shown in Fig. 4, their forward ends lying somewhat above the surface of the ground, and their rear ends lying at an elevation sufficient to raise the corn stalks eventually into such a position that said stalks can be conveniently operated upon by the snapping rolls presently to be described. A convenient construction is that illustrated in which the table 21 is connected to the bar 24, the table 22 to the bars 25 and 26, and the table 23 to the bar 27. The central portions of these bars are journaled on the axle 11, and their rear ends will rise and fall within limits which may be determined by the operator. Inasmuch as the center of gravity of the tables is substantially forward of the pivotal points on the axle, the tables will normally stand in their lowermost position illustrated in Fig. 4, but they will be raised by the rising of the aprons when necessary to pass over inequalities in the surface of the ground. In order to limit the amount of upward movement of the tables, I have illustrated the lever arm 28 pivoted at the point 29, said lever arm being provided with a lock 30 working on the rack 31, so that the lever arm may be locked in any desired position. Connected to the forward end 32 of the lever arm are the loops 33 corresponding to the bars 24, 25, 26, and 27, said loops being raised or lowered by operation of the lever 28. The rear ends of the bars 24, 25, 26, and 27 normally stand against the upper portions of the loops 33 and the swing of the said bars is limited by the lower portions of said loops.

As shown particularly in Fig. 2, the tables 21 and 23 have their outer edges curled or beaded under. Each of said tables not only slants upward from front to rear, but is divided longitudinally into portions which slant respectively toward the sides and toward the center of the machine. The inner edges 34 of said tables lie at substantially the same elevation as their outer beaded edges 35, and said inner edges lie close to the corresponding snapping rolls. The table 22 comprises the portions 36 and 37 respectively, so that said table not only slants upward from front to rear, but also assumes an A-shaped cross section, as shown in Fig. 3. The side portions 38 and 39 of said table lie close to the corresponding snapping rolls, as best shown in Fig. 1.

Reference to Fig. 1 will disclose a trough 40 lying immediately behind the table 22. The front end of said trough is closed by the wall 41, and its rear end is closed by the wall 42. Reference to Fig. 2 shows that the side portions 43 and 44 of said trough slant downward and toward each other, their upper edges 45 and 46 lying adjacent to the corresponding snapping rolls. The front ends of the edges 45 and 46 lie adjacent to the rear ends of the edges 38 and 39 respectively, so that the material traveling along the snapping rolls will pass from the side edges of the table 22 directly to the side edges of the trough 40. The lower portion of the trough is depressed as at 47 to accommodate a conveyer presently to be described.

Each pair of snapping rolls comprises cylinders 48 and 49 having the helical teeth or flanges 50 on their surfaces, so that as said cylinders are rotated in opposite directions and toward each other, a stalk lying between them will be caught by the flanges 50 and forced to travel toward the rear by said flanges, while at the same time the downward movement of the cylindrical surfaces will force the stalk down toward the ground along its own axis. On account of the fact that the distance between the snapping cylinders or rolls is not sufficient to pass the ears of corn, said ears will be stripped off and the stalk will be delivered downwardly free from ears. The ears so stripped will fall down into the hopper 40, and be delivered to the conveyer therein.

Reference to Fig. 1 shows that the front portions of the tables 21, 22, and 23 are spread apart a slight amount so as to provide V-shaped or wedge-shaped openings between them. These are the openings 51 and 52 of Fig. 1. As the snapper is caused to travel along the ground toward the right in Fig. 1, the corn stalks will enter the one or the other of said V-shaped openings and will be taken hold of by snapping rolls and operated upon in the manner just described. In order to facilitate the entrance of corn stalks between the snapping rolls, I have shown the traveling chains 53 and 54 adjacent to the opening 51 and the traveling chains 55 and 56 adjacent to the opening 52. These chains have outwardly projecting teeth which travel rearwardly as the snapper travels forward and thus cause the stalks to enter the snapping rolls. The several chains just described are preferably driven at such a speed that their teeth stand practically stationary with respect to the ground while said teeth are in working position, as shown in Fig. 1, the snapper, in the meantime advancing along the ground.

The trough 47 carries the conveyer 57 which travels rearwardly along said trough and then passes down and underneath to the forward end of the trough. This conveyer has suitably constructed teeth or the like which carry the stripped ears to the rear of the trough where they will be taken up by another conveyer 58 and delivered away from the snapper to any desired point. The conveyer 58 may be a portion of a separate device, if desired, said device, for example, taking the form of a wagon traveling along beside the snapper and adapted to receive the ears as they are delivered from the snapper.

Each of the tables 21, 22 and 23 has its forward portion suitably formed to provide, or else carries, an apron which travels along close to the ground and sweeps practically the entire surface of the ground between the several corn rows so as to start the lifting of the down stalks in the manner and for the purposes previously set forth. In the particular construction illustrated, these are the aprons 59, 60 and 61, and they are herein shown as being separate from and movable with respect to the several tables. The cross section of said aprons is such that they coöperate effectively with the front portions of the tables to deliver the stalks evenly onto said tables. In order to support the aprons, I have provided the forwardly extending poles 62, 63 and 64 respectively, the front ends of said poles being connected to the aprons and the rear ends of the poles being pivoted to the axle 11. On the front end of each table is a loop 65 through which is passed the corresponding pole, and said loops serve to limit the vertical movement of the poles and aprons with respect to the tables. Each of the aprons preferably lies at a more acute angle to the ground than does the corresponding table so as to secure an easier lifting force on the corn stalks, and so as to more easily sweep beneath or under the down stalks. The rear end of each apron is provided with a plate or the like 66 which extends up and overlies the front end of the corresponding table so as to pass the stalks easily to the table. If desired, pins or the like 67 may be provided for loosely connecting the proper aprons and tables together, while at the same time permitting the desired amount of free play.

As shown in Fig. 1, the side edges of the aprons form the front portions of the V-shaped openings 51 and 52. As the snapper travels along the ground, the aprons will wedge themselves under the down stalks, and by the time the snapper has advanced substantially the length of said aprons, the stalks will have been raised only a comparatively small distance because of the acute angle at which the aprons lie with respect to the ground. However, the rear portions of the aprons are of considerable width, so that by the time said rear portions are reached, a very substantial portion of the total length of the down stalk will be lying on the apron. In order to facilitate the travel of the stalks upward along the tables, I have provided the chains 68, 69, and 70, best shown in Figs. 1 and 2, said chains being provided with teeth between which the stalks will lie. These chains are driven in such a manner that they travel upward and then to the rear, afterward returning to the front of the machine underneath the tables. Also they travel at such speed that their upper or exposed portions remain substantially stationary with respect to the ground, or even travel rearward with respect to the ground, while the snapper is advancing. The chains extend forward with respect to the rear portions of the aprons, so that they take hold of the corn stalks before said stalks have left the aprons. Consequently, the chains come into action before the relatively steep slope of the tables is reached. The chains 68 and 70 of the tables 21 and 23 preferably lie along the ridges of said tables, as shown in Fig. 2, so that they will operate upon stalks coming from either side. It will be noted in this connection that by the provision of a double row machine, three aprons and three tables and the corresponding chains are sufficient to do the work for both the corn rows, whereas at least two aprons and two tables and the corresponding chains would be necessary for a single row machine.

In the particular construction illustrated, I have shown various geared and chain connections for driving the snapping rolls, conveyers, and chains from the axle 11, but it will be understood that any other suitable means might be provided for securing such drives, as, for example, a gasolene engine. I wish also to point out the fact that any other suitable construction might be provided for advancing the snapper along the ground, and I have shown a horse-driven construction for accomplishing this result, simply as a matter of convenience in illustration.

An examination of Fig. 3 in particular will disclose the fact that the tables 21, 22 and 23 are so formed and supported that they present their flat surfaces almost directly to an observer looking at them from the front. In other words, a vertical section taken through these tables at right angles to the direction of travel will cut the planes of the tables on lines which lie almost horizontal. The result is that, as the snapper travels forward, the flat surfaces of the tables are presented almost directly to the corn stalks so as to exert a direct lifting force on said stalks throughout the entire contacting lengths of the stalks. Such a construction may be distinguished from one in which the tables slope downward toward each other at a very steep angle to the horizontal so as to present a steep trough or channel extending fore and aft of the machine, and having its side walls formed by the tables.

I wish also to call attention to the fact that the chain carriers 53, 54, 55, and 56 serve not only to assist in directing the corn stalks into the snapping rolls, but said carriers also assist in carrying rearwardly the removed ears and insuring delivery of said ears into the hopper or trough 40. Some of the ears will snap off before the corn stalks have traveled rearwardly the full length of the snapping rolls, and said ears would tend to fall forward and down into the spaces or openings 51 and 52. Such ears, however, will be carried rearwardly by the chain carriers toward the hopper. In this connection, I desire also to point out the fact that the outside chain carriers 53 and 56 extend rearwardly a greater distance than the inside carriers 54 and 55. Consequently, as the ears are carried toward the rear in the manner just described, they will first be released from the bite of the inside carriers, and the rearward travel of the outside carriers, after such release, will tend to swing the ears around and inwardly toward the hopper 40, so that the ears will be readily delivered into said hopper.

These chain carriers serve to deflect the corn stalks into the snapping rolls because they extend forwardly along the sides of the openings 51 and 52. They then assist in raising the stalks over the rolls, and also assist in delivering the snapped corn ears to a higher point.

It will be observed that both sets of snapping rolls serve to deliver the snapped ears to a common hopper or receptacle from which they may be removed by a carrier or conveyer 58. Therefore, the herein described arrangement is one in which the ears from two sets of snapping rolls will be delivered to a common conveyer.

The interval necessary to pass the corn stalk down between the snapping rolls is dependent, among other things, upon the length of stalk to be passed. However, the time interval necessary to pass a stalk from the front to the rear ends of the snapping rolls is relatively unchanging. Consequently, the extremely long stalks may not be passed downwardly through the rolls their full length so as to remove all of the corn during the interval in which the said stalks are traveling rearwardly. It will, however, be observed that the axle 11 extends across the space beneath the snapping rolls, and that, therefore, as soon as the gathering machine has traveled a sufficient distance, said axle will strike against the stalks and press them downward so as to assist in drawing the long stalks through the snapping rolls, thereby overcoming the difficulty above pointed out.

I claim:

1. In a corn gathering machine, the combination with a suitable wheeled framework, and a connection for driving the same from the rear, of a table of inverted V-shaped cross-section mounted on the central forward portion of the frame-work, with its ridge portion lying on the center line of the machine and slanting upwardly from front to rear, another table of inverted V-shaped cross-section mounted on the frame-work at each side of the first mentioned table, each of the last mentioned tables having its ridge portion sloping upwardly and rearwardly toward the center line of the machine, and the rear portion of each of the last mentioned tables extending rearwardly with respect to the rear portion of the first mentioned table, a relatively flat apron adjacent to the forward end of each table, each apron overlying and extending forwardly of the forward end of the corresponding table, a pivoted connection from each apron to the frame of the machine to permit the said apron to rise and fall with respect to the corresponding table, each apron sloping upwardly and rearwardly at a lesser angle than the corresponding table, a pair of snapping rolls between each side portion of the central table, and the adjacent side table, means for driving all of the snapping rolls, a carrier traveling in the ridge portion of each table, means for operating said carriers to cause them to advance rearwardly with respect to their respective tables, a pair of carriers adjacent to each pair of snapping rolls, and means for operating said carriers to cause them to travel rearwardly with respect to the adjacent tables, substantially as described.

2. In a corn gathering machine, the combination with a suitable frame-work and a connection for driving the same in its rear portion, of a table of inverted V-shaped cross-section mounted on the central forward portion of the frame, the ridge portion of said table slanting upwardly and rearwardly on the center line of the machine, a table of inverted V-shaped cross-section adjacent to each side of the first mentioned table, the ridge portion of each of said side tables slanting upwardly and rearwardly and toward the center line of the machine, the rear portion of each of the side tables extending rearwardly with respect to the rear portion of the central table a pair of snapping rolls between each side of the central table and the adjacent side table, means for driving the snapping rolls, a relatively flat apron adjacent to the forward portion of each table, each of said aprons lying at an angle more nearly horizontal than the corresponding table, and pivoted connections from the frame of the machine to the aprons to permit the said aprons to move up and down with respect to the frame of the machine, substantially as described.

3. In a corn gathering machine, the combination with a suitable frame-work and a connection for drivng the same in its rear portion, of a table of inverted V-shaped cross-section in the central forward portion of the machine, the ridge portion of said table slanting upwardly and rearwardly, a side table at each side of the central table, each side table being of inverted V-shaped cross-section and having its ridge portion slanting upwardly and rearwardly and toward the axis of the first mentioned table, a pair of snapping rolls between each side of the first mentioned table and the adjacent side table, means for driving the snapping rolls, a relatively flat apron adjacent to the forward portion of each table, each apron lying at an angle more nearly horizontal than the corresponding table, and operative connections from the frame to the aprons to permit the said aprons to move vertically with respect to the frame, substantially as described.

4. In a corn gathering machine, the combination with a suitable frame-work and a connection for driving the same in its rear portion, of a table of inverted V-shaped cross-section mounted on the forward central portion of the frame, the ridge portion of said table extending upwardly and rearwardly, a side table mounted at each side of the central table, each side table being of inverted V-shaped cross-section and having its ridge portion extending upwardly and rearwardly with respect to the frame, a pair of snapping rolls mounted between each side of the central table and the adjacent side table, means for driving the snapping rolls, an apron adjacent to the forward portion of each table, each apron lying at an angle more nearly horizontal than the corresponding table, and an operative connection from the frame to each apron, substantially as described.

5. In a corn gathering machine, the combination with a suitable frame-work and a connection for driving the same in its rear portion, of a pair of tables of inverted V-shaped cross-section mounted on the forward portion of the machine, each of said tables having its ridge portion extending upwardly and rearwardly, a pair of snapping rolls between said tables, means for driving the snapping rolls, an apron adjacent to the forward portion of each table, each apron lying at an angle more nearly horizontal than the corresponding table, and a flexible connection from each apron to the frame of the machine to permit the said apron to move vertically with respect to the frame of the machine, substantially as described.

6. In a corn gathering machine, the combination with a suitable frame-work and a driving connection in the rear portion of the same, of a pair of tables of inverted V-shaped cross-section mounted on the forward portion of the frame with their adjacent edges in close proximity to each other, a pair of snapping rolls between said adjacent edges, means for driving said snapping rolls, the ridge portion of each table extending upwardly and rearwardly, an apron mounted in coöperative position adjacent to the forward portion of each table, each apron lying at an angle more nearly horizontal than the corresponding apron, and a flexible connection between each apron and the frame of the machine to permit the said apron to move in a vertical direction with respect to the frame of the machine, substantially as described.

7. In a corn gathering machine, the combination with a suitable frame-work and a connection for driving the rear portion of the same, of a pair of tables of inverted V-shaped cross-section mounted on the forward portion of the frame, the ridge portion of each table extending upwardly and rearwardly, a pair of snapping rolls between the tables, means for driving the snapping rolls, a relatively flat apron adjacent to the forward portion of each table, and a flexible connection between each apron and the frame of the machine to permit the said apron to move vertically with respect to the frame of the machine, substantially as described.

ALONZO R. KEELER.

Witnesses:
A. C. KEENER,
F. H. OLSON.